United States Patent [19]

Danninger

[11] 4,152,938

[45] May 8, 1979

[54] AIRCRAFT TEMPERATURE PROBE

[76] Inventor: Karl Danninger, P.O. Box 3125, Boulder, Colo. 80307

[21] Appl. No.: 907,835

[22] Filed: May 19, 1978

[51] Int. Cl.² .............................................. G01K 1/08
[52] U.S. Cl. ...................................................... 73/349
[58] Field of Search ......................... 73/349, 212, 213; 338/28

[56] References Cited

U.S. PATENT DOCUMENTS

| | | | |
|---|---|---|---|
| 2,588,840 | 3/1952 | Howland | 73/349 |
| 3,016,745 | 1/1962 | Simon | 73/349 |
| 3,170,328 | 2/1965 | Werner et al. | 73/349 |

*Primary Examiner*—Anthony V. Ciarlante
*Attorney, Agent, or Firm*—Kyle W. Rost

[57] ABSTRACT

A temperature probe has an elongated spindle-like body with an axial bore of uniform diameter extending entirely therethrough. The forward end of the probe has a knife-sharp edge surrounding the bore opening for ice-free performance. An annular air intake in the bore wall leads to an annular, rearwardly and radially outwardly extending sensor channel containing a bare wire element in an annular zig-zag pattern relative to air flow in the channel. The channel has an outlet near the radially widest part of the probe body, allowing venturi action of the exterior air stream to aid in drawing air through the channel from the bore. A heating element may be mounted downwind of the sensor element. The channel and sensor element are radiation shielded by a hollow area in the probe body between cooperating walls, and bleed holes may direct boundry layer air into the hollow area upwind of the sensor element and out of the hollow area downwind of the sensor element.

8 Claims, 7 Drawing Figures

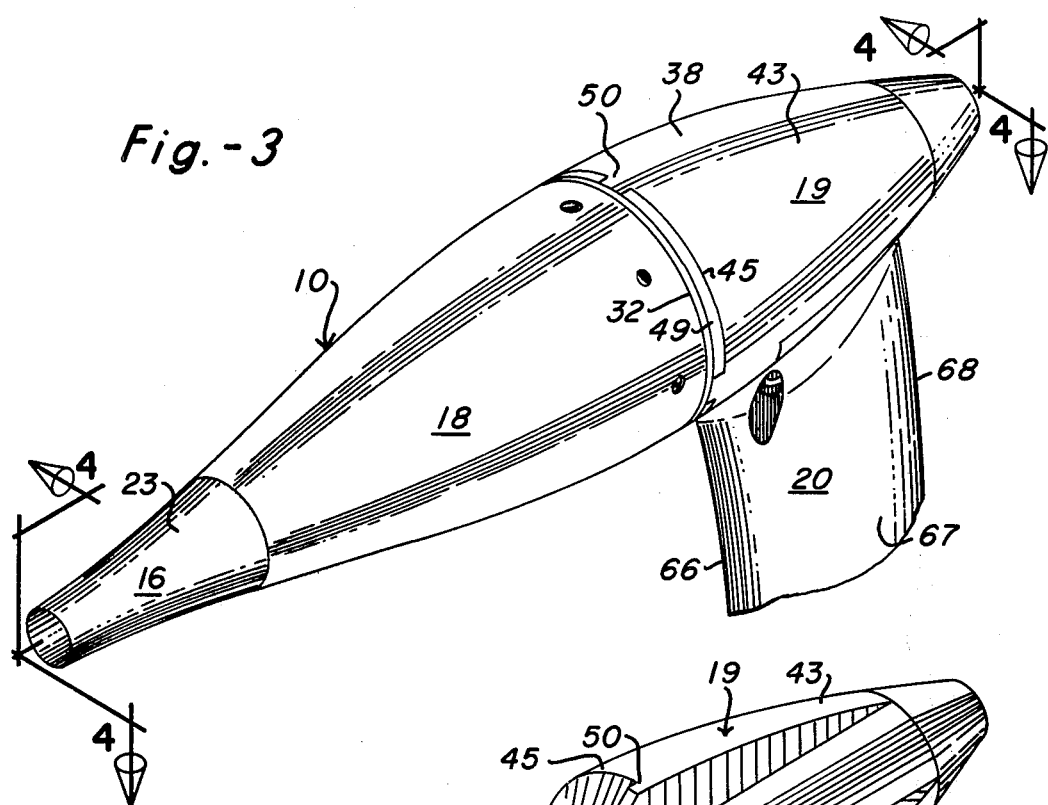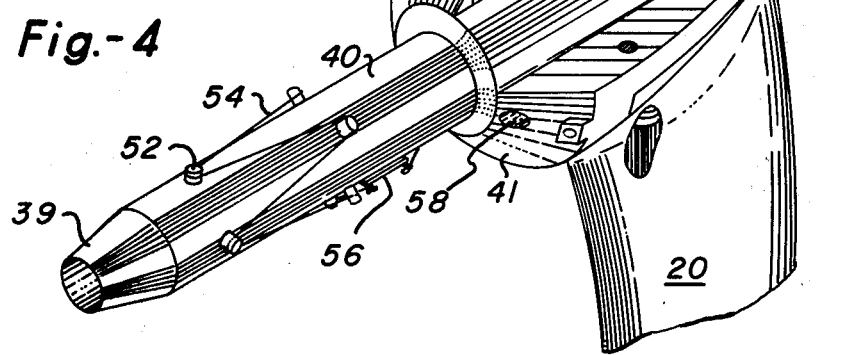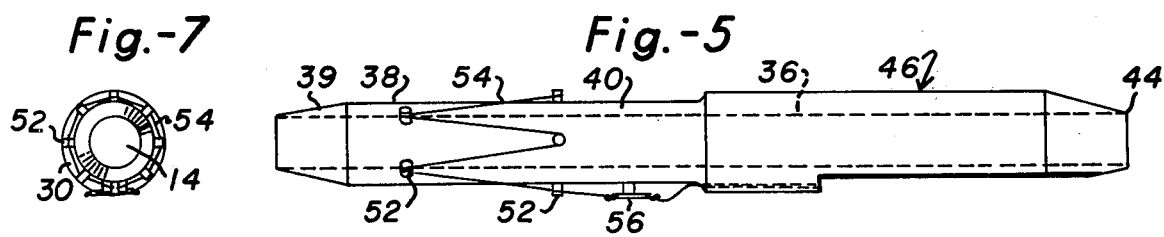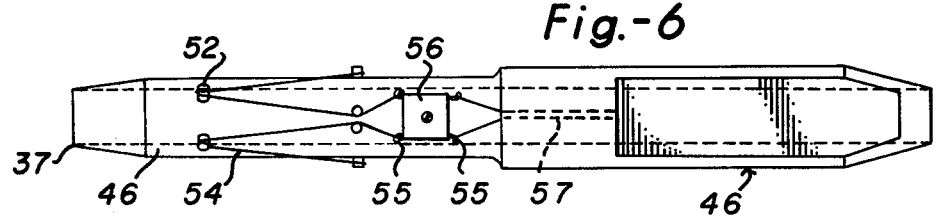

AIRCRAFT TEMPERATURE PROBE

BACKGROUND OF THE INVENTION

1. Field of the Invention

The invention relates to measuring and testing, especially to the detection of fluid temperature and related data. An air temperature probe is disclosed for use in making in-flight temperature measurements on aircraft operating in an airstream.

2. Description of the Prior Art

Temperature probes suitable for use on aircraft are required to make fast, accurate, continuous temperature measurement of the outside air in the airstream surrounding the aircraft. The measurement is used for a variety of purposes, including the adjustment of air/fuel ratios. Air temperature is well recognized as an important factor to be known when operating an aircraft.

The accuracy and time constant are two factors by which temperature sensors are judged. Accuracy is often impaired due to dynamic airstream heating and measurement falsification by heated housings. In the past, it has been necessary to create heated temperature probe housings in order to prevent icing, and the heated air must then be deflected in some manner to prevent a false reading, or alternatively, the temperature sensing element must compensate for the expected influence of the heating element. In either case, inaccuracies are introduced into the temperature reading.

The temperature sensing element on an aircraft is always mounted in a housing for the purpose of protecting the element from damage, for example from the impact of rain, ice, hail, dust or air velocity. Often the air flow inside the housing is deflected at 90° from the direction of entry in order to separate particles by inertial force. Deflection of air flow can result in slower response time of the sensor and inaccurate readings. Deflection of the air stream may result in turbulence, disrupting the fast time response of the instrument relative to the speed of the aircraft.

The invention is an air temperature probe that offers ice free performance without heating, and senses temperatures with superior accuracy and time constant.

SUMMARY OF THE INVENTION

A total temperature probe for use on aircraft moving in an air stream employs a round, spindle-shaped housing having an uniform axial bore passing through in the general direction of aircraft movement. The forward end of the bore has a knife-sharp mouthpiece that resists ice formation, and the housing flares radially outwardly and rearwardly from the mouthpiece to a maximum outer diameter, and then curves radially inwardly and rearwardly to a termination point at the tail of the uniform axial bore. Inside the housing, the bore is substantially straight and contains no protruding elements to disrupt air flow. However, at a point between the mouth and the maximum outer diameter, the bore wall is apertured to connect with a sensor channel that runs to an exterior opening at the maximum diameter of the housing. The temperature sensor element is located in the sensor channel and is contacted by the clean air stream at reduced velocity.

The object of the invention is to create an ice free temperature probe that does not require a heating element forward of the temperature sensing element.

A further object is to create an aircraft temperature probe wherein the air flow over the sensing element is relatively straight, rather than deflected or reversed.

Another important object is to create an aircraft temperature probe wherein the air flow through the channel containing the sensing element is fast, uniform, and without turbulence in order to obtain as low a time constant as possible for the measurement, relative to the indicated flying speed of the aircraft.

BRIEF DESCRIPTION OF THE DRAWINGS

FIG. 3 is an isometric view of the probe and a portion of the base.

FIG. 4 is a view similar to FIG. 3 with the central housing removed for clarity and the rear housing in section taken along the lines 4—4 of FIG. 3.

FIG. 5 is a side elevational view of the tubular core portion of the rear housing.

FIG. 6 is bottom view of the core of FIG. 5.

FIG. 7 is a front elevational view of the core of FIG. 5.

DESCRIPTION OF THE PREFERRED EMBODIMENT

Figure 1:
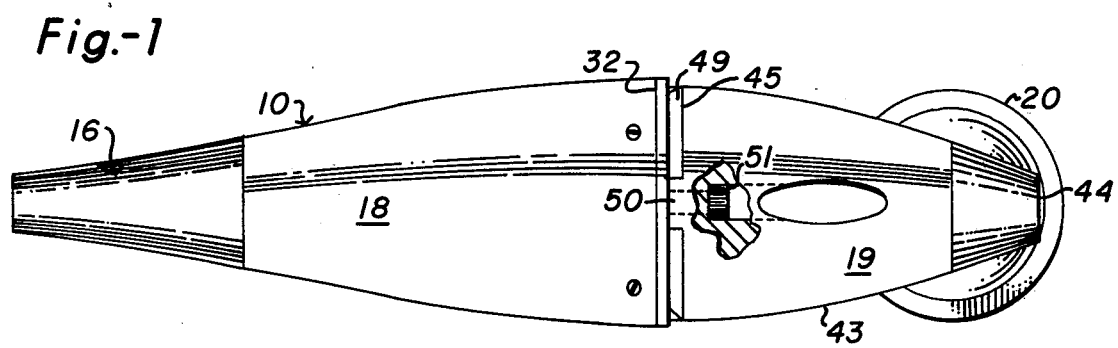
FIG. 1 is a top plan view of the probe, partially broken away.
Figure 2:
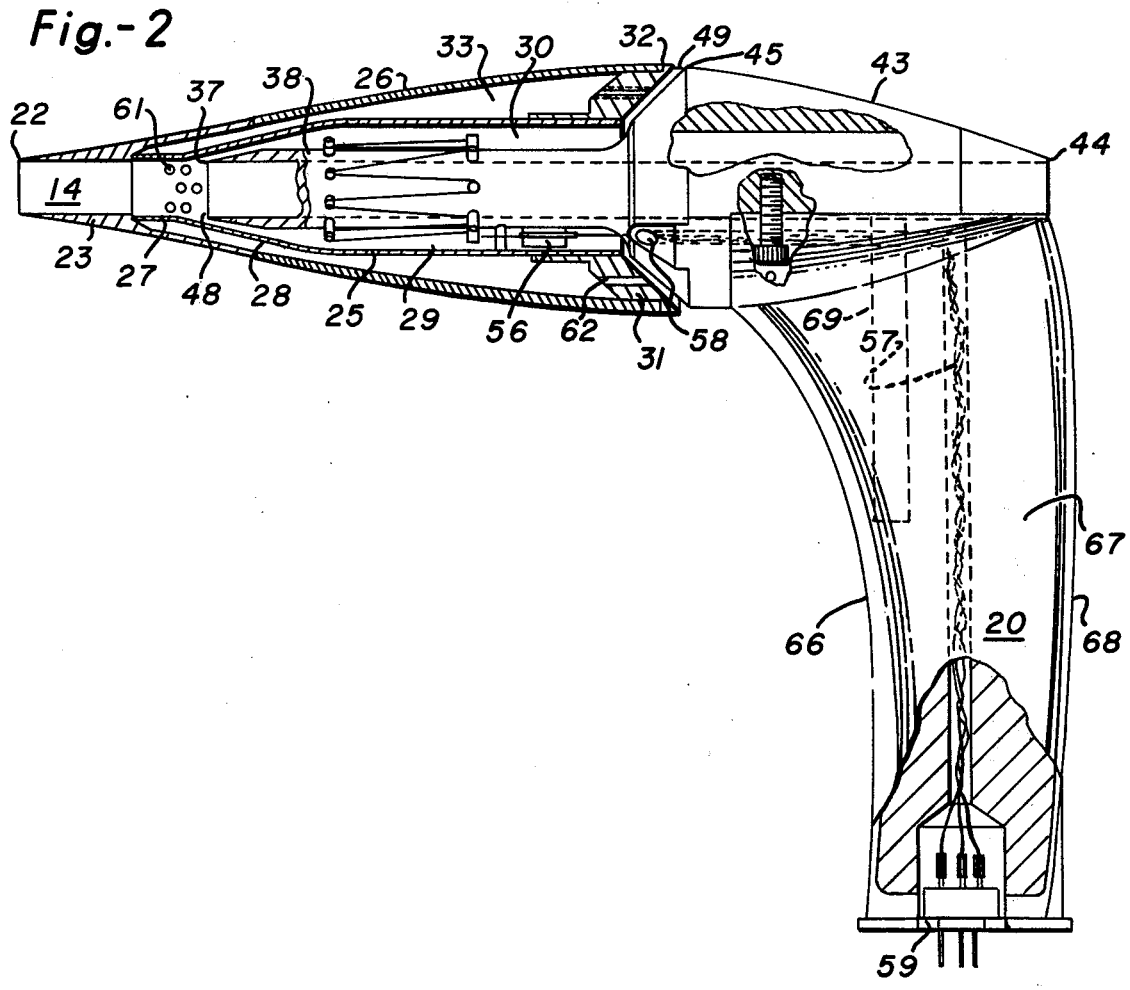
FIG. 2 is a side elevational view of the probe, with the mouth and central housing in vertical section and the rear housing and base partially broken away.

The aircraft temperature probe 10, best shown in its entirety in FIG. 2, measures the total air temperature of the air stream through which an associated aircraft is moving. The probe is mounted on any suitable portion of the aircraft in general axial alignment with the direction of intended aircraft motion; hence, the forward and rearward ends of the probe are to be axially aligned with the corresponding ends of the aircraft in its flight attitude.

The probe 10 has a housing defining bore 14 extending axially from the front to the rear of the probe. The bore is preferably of uniform diameter throughout its length and receives a substantially coaxial stream of air moving from its front to its rear, due to the motion of the aircraft through the surrounding air stream. The forward end of the housing may have a mouthpiece 16 defining the forward end of the bore, and a central housing member 18 may define the radially outwardly and rearwardly flaring portion of the probe. The rear end of the probe is formed by radially inwardly and rearwardly curving member 19, which terminates at the axially rearwardly opening end of bore 14. A suitable base 20 may connect the housing to the aircraft.

Mouthpiece 16 annularly surrounds the forward portion of bore 14 to define the bore wall as well as the forward exterior wall of the housing. The forward end 22 of the mouthpiece is knife-sharp, and the exterior circumferential wall 23 of the mouthpiece angles radially outwardly and rearwardly at a small angle relative to the axis of the bore, for example at approximately 5°. This exterior wall is highly polished, and the entire mouthpiece is preferably constructed from a hard, durable material such as stainless steel. In a probe having an axial length of from six to eight inches, the mouthpiece may have a length of approximately one to two inches.

The knife-sharp forward edge of the mouthpiece and the polished exterior wall aid in preventing ice build-up when the probe is operated at high altitudes. Supercooled water droplets freeze instantly upon impact, but the knife edge of the mouthpiece is able to avoid ice build-up because of its sharpness and the overall design of the probe.

Central housing member 18 is smoothly connected to the rear end of mouthpiece 16 and extends rearwardly to approximately the radially widest part of the probe. This member may be formed from aluminum and preferably has both an inner tubular wall 25 and an outer aerodynamically contoured wall 26. The inner wall has a forward portion 27 cooperating with the interior of mouthpiece 16 to form a smooth, uniform wall for bore 14. Rearwardly of portion 27, wall 25 flares radially outwardly at portion 28 and then extends axially rearwardly again at portion 29 to define the outer wall of the sensor channel 30. Finally, wall 31 angles radially outwardly and rearwardly from the rear of wall 25, for example at approximately 45° and terminates at a junction 32 with wall 26. Wall 31 need not be integral with wall 25, but may be a separate annular element later connected to 25.

Outer wall 26 forms a smooth curve between the mouthpiece 16 and junction 32, and flares radially outwardly and rearwardly throughout this axial distance. The slope of wall 26 relative to the axis of bore 14 is generally greater than the slope of wall 28, although considerable variation is possible in the contour of this wall. In the preferred form, wall 26 is spaced from wall 26 by a hollow area 33, acting as a radiation shield for the temperature sensor element described hereafter. Walls 25 and 26 are attached at their forward ends to mouthpiece 16. At their rearward ends, walls 25 and 26 may be held together by screws through wall 26 into wall 31, which is best shown in FIG. 2 to be a reinforcing element at the rear of central housing 18. Both walls 25 and 26 are characterized by the lack of abrupt breaks in their smooth contours and for this reason do not disrupt the smooth flow of air past any of their surfaces.

Rear housing member 19, best shown in FIGS. 4-6, is formed in various contours to complete the aerodynamic styling established by the central housing member. The interior of member 19 contains the rearward portion of bore 14 within the cylindrical surface 36, having substantially the same diameter as the forward portion of the bore and axially aligned therewith. At the forward tip of surface 36, member 19 may have a sharp edge 37 from which originates the outer surface 38 of member 19. Surface 38 extends radially outwardly and rearwardly at portion 39 generally parallel to portion 28, then axially rearwardly at portion 40 generally parallel to portion 29, and axially rearwardly and radially outwardly at portion 41 generally parallel to wall 31. Channel 30 is defined by the spacing between wall portions 28, 29, and 31; and portions 39, 40, and 41 of wall 38 respectively. Exterior portion 43 of wall 38 extends in a smooth curve between portion 41 and rearwardly facing edge 44 at the tail of bore 14. The union between portions 41 and 43 may be a relatively sharp edge 45. Member 19 may have two piece construction with tubular portion 46, FIGS. 5 and 6, defining the bore 14 and aerodynamically shaped member 47, FIG. 4, completing the desired form.

As shown in FIGS. 2 and 7, channel 30 may be annular and receives a portion of the air stream through annular intake orifice 48 formed at the spacing between edge 37 and wall 25. The air stream exits channel 30 through annular outlet orifice 49 formed between junction 32 and edge 45. Joining means such as arms 50 may extend between housing members 18 and 19 to maintain channel 30 in the desired configuration. In one arrangement, the arms 50 are integrally joined to housing member 19 on wall 41 adjacent to edge 45 and extend forwardly against wall 31 adjacent to edge 32, where screws 51 hold member 18 to arms 50. By axially altering the relationship between members 18 and 19, it is possible to adjust the relative air flow passing through channel 30 as compared to bore 14. Ordinarily such adjustment would be made by altering the axial length of arms 50.

With reference to FIGS. 2, 4, 5, 6, and 7, the temperature sensor element in the probe is carried in channel 30, preferably connected to wall 38 at portion 40 for ease in access when the probe is disassembled. Mounting posts 52, preferably constructed of a heat insulating material such as plastic, are connected to wall portion 40, for example by screws, and are arranged in two annular rows, each in a plane transverse to the axis of the probe, a first row near the forward end of portion 40 and the second row near the rearward end of portion 40. The posts are axially staggered, and a 0.001 inch platinum sensing wire 54 is strung between the posts to form a diagonal pattern relative to the axis of the probe. The wire 54 functions as a resistance wire to register temperatures in the manner well known in the art. As is also known, the wire is to be of known, predetermined length, for example 450 mm. to provide known resistance, and the number and spacing of the posts 52 is arranged to allow the desired length of wire to be fully strung between the posts with the opposite ends of the wire being connected to contact arms 55 on electrical insulator 56. A suitable cable 57 is attached to the opposite ends of arms 55 and connects the wire 54 to further apparatus for recording the resistance of the wire. For this purpose, a passageway 58 may be formed in housing 19 to carry cable 57 into base 20, where the cable terminates in plug 59, FIG. 2, connectable to the aircraft. The plug 59 may engage known types of apparatus for interpreting the resistance changes of wire 54.

In operation, the aircraft carries the probe axially forwardly through the air stream, resulting in air flow directly into the bore 14 as well as around the exterior walls of the probe. The straight bore 14 is of uniform diameter throughout the probe, except at intake orifice 48 where the air stream may be partially bled into channel 30. Because of the constant diameter, the air stream is not appreciably accelerated in bore 14, and as a result there is no dynamic heating.

Flow around the outside of the probe is also smooth as directed by the illustrated contour of the housing. The outer diameter of the housing reaches a maximum at the outlet orifice 49, and then decreases according to the contour of wall 43, eventually returning to the diameter of bore 14 at edge 44. The axial passage of the air stream over outlet orifice 49 creates suction at the orifice and aids in drawing a portion of the air stream from bore 14 through channel 30 and out orifice 49.

The sensing wire 54 is in the free air flow through channel 30 and has an extremely fast response to the temperature of the air. This wire is an open wire element, and because of the diagonal winding to the air stream, the wire can be struck by each air molecule only once.

A total air temperature is measured by the platinum resistance wire. The air flow is slowed approximately adiabatically in the vicinity of the sensing wire to about 41% of the free-stream air velocity, due to the volume of channel 30 in addition to the volume of bore 14 at any point in the axial length of the channel.

The open wire element is able to function in the probe in a practical manner because solid particles are not directed through channel 30. The uniform cross-sectional area of the bore throughout substantially its entire length causes any solid particles entering the bore to be accelerated into the direction of the bore axis and to move with the linear air stream in the forward portion of the bore, that is, the portion between edge 22 and intake orifice 48, wherein the airstream has velocity V1-A. The air stream in bore 14 is slowed in the latter portion, that is the portion between intake 48 and edge 44, wherein the airstream has velocity V1-B. The airstream slows in this area because some of the air is bled into channel 30 at intake 48 and is directed over the sensing wire with air velocity V2. The relationship $V1\text{-}A = V1\text{-}B + V2$ expresses the ideal operation of the probe, and wind tunnel tests have confirmed that this relationship is approximately correct in the actual operation of the probe. Accordingly, solid particles in the air stream pass directly through bore 14 and are not deflected into channel 30. Flight tests with the probe have shown a perfect performance history of never having had the open wire element fail due to foreign object damage.

This performance history is enhanced by a record of an accuracy that is markedly superior to presently known aircraft temperature sensor probes. Instrumental comparisons between the probe employing the above described sensor wire and a reference exposed fine resistance wire thermometer show close correlation in readings of phase, spectra, and coherence. The time constant for the probe is shorter than 0.01 second (approximate measured value on Q.A. about 0.003 second, based on a 22° phase shift at 20Hz.) and the recovery factor is close to 1.0, for example 0.9931653.

In the preferred construction, the probe housing is constructed of anodized aluminum, with the exception of the stainless steel mouthpiece. The aluminum may be spun to form the desired shape of walls 25 and 26. For use at sonic and supersonic speeds, stainless steel should be used for walls 25 and 26 as well as for tubular portion 46 of the rear housing member. Also, for sonic speeds a convergent-divergent ring may be added to the rear end of the bore at tubular portion 46 in order to produce a shock wave to choke the air flow.

A modification to avoid boundary layer effects includes the addition of holes 61 to wall 25 near intake orifice 48, for example in a ring following the annular shape of wall portions 27 or 28. Boundary layer air may drain through these holes into hollow area 33, and wall 25 may also have exit holes 62, for example in wall 31, allowing the boundary layer air to join the stream from channel 30 downwind of the sensor element. The air passage through hollow area 33 would additionally aid the radiation shielding function of the hollow area. Another boundary layer control technique involves the relative axial repositioning of housing member 19 relative to housing member 18, increasing or decreasing the area of intake 48. Because the probe requires unobstructed flow through bore 14, the preferred structure for mounting the probe on an aircraft is by a base 20 extending perpendicularly to the axis of bore 14. It is preferred that the base attach to the probe at housing member 19, for example at a recess in portion 47 rearwardly at edge 45. The standard may have an appropriate aerodynamic shape with a relatively narrow forward edge 66 that increases in thickness to a maximum at 67 and then terminates rearwardly with a curved surface 68. The center of the standard is hollow to accommodate cable 57 for connection to the temperature sensing element. The recess in portion 47 is preferably at the circumferential position corresponding to the location of the free ends of the sensing wire element and passageway 58.

The base as described is not ice free, but ice accumulation on the base has been found to be of little concern. However, in order to assure that excessive ice buildup does not obstruct the outward flow of air from orifice 49 or from the rear end of bore 14, a heating element 69 may be carried in the base or in housing member 19, for example in portion 47. The heating element may be of any known type, for example an electrical resistance element having its wires running in the hollow base. This element does not create inaccuracy in the temperature readings of the probe because it is located rearward of the sensing wire. The constant rearward flow of air through the probe at sub-freezing ambient temperatures effectively prevents conduction of the heat forwardly in the probe to the region where the sensing wire would be influenced.

The above description of the probe is provided by way of example and not limitation. Various changes in details of design are possible and are intended to be within the scope of the invention. Specifically, the invention has been disclosed with respect to a temperature probe, but it should be understood that other types of data could be measured. The sensor element has been described as a sensing wire, but any other known type of sensor device could be substituted for the sensing wire in the sensor channel and gain similar benefit of avoiding contact by massive particles in the air stream. Thus, the invention may be referred to as a data probe to reflect the broad scope of its applicability.

I claim:

1. A fluid stream data probe, comprising:
   (a) a probe housing having an axial bore therethrough, said bore having forward and rearward open ends respectively at forward and rearward ends of the housing for conveying fluid therethrough;
   (b) the forward end of the housing surrounding said forward bore opening being knife-sharp for resisting ice formation thereon;
   (c) the outer surface of the housing increasing in diameter rearwardly along said axial bore to a portion of maximum width;
   (d) the housing forming a radially outwardly and rearwardly extending channel therein having an intake orifice in the bore wall and an outlet orifice in the outer surface of the housing near said portion of maximum width for conveying a portion of the fluid from the bore through said channel;
   (e) a sensor element carried in said channel; and
   (f) means for mounting the probe in the fluid stream.

2. The probe of claim 1, wherein said axial bore is of uniform diameter throughout the probe between said forward and rearward ends.

3. The probe of claim 1, wherein said housing further comprises an outer wall axially between the intake and outlet orifices of said channel, forming said outer surface of the housing; and an inner wall axially between the intake and outlet orifices forming the radially outward wall of said channel, the inner and outer walls having a hollow area therebetween for shielding radiation from said sensor element in the channel.

4. The probe of claim 3, further comprising a first boundary layer bleed orifice located on the inner wall of said housing near said intake orifice and communicating with said hollow area to drain boundary layer fluid from the stream of fluid entering the channel prior to contacting the sensing element; and a second bleed orifice located on said radially outward wall of said channel rearwardly of said sensor element and communicating with said hollow area to return the boundary layer fluid to the channel.

5. The probe of claim 1, wherein said channel is annular about said bore and said housing further comprises post means attached to the housing in said channel for supporting said sensor element in a zig-zag annular pattern relative to the axis of said bore for allowing molecules of fluid passing over the sensor element to strike the sensor element only once.

6. The probe of claim 5, wherein said housing further comprises:
(a) at least forward and rearward separable portions, the forward portion comprising said knife sharp forward end, and wall means extending rearwardly therefrom to define said outer surface of the probe to said portion of maximum width and to define a forward length of said bore and the radially outward side of said channel;
(b) the rearward portion comprising wall means extending forwardly from the rearward open end of the bore to define an outer surface of the probe to said portion of maximum width, a rearward length of said bore, and the radially inward side of said channel.

7. The probe of claim 6, wherein said post means comprises a forward and a rearward annular ring of posts connected to the radially inward side of the channel with the posts in the two rings being axially staggered.

8. The probe of claim 1, further comprising heating means connected to the probe housing rearwardly of said channel for preventing icing on the rear of the housing while avoiding heating the fluid forwardly of said sensor element.

* * * * *